No. 693,365. Patented Feb. 18, 1902.
J. C. BLEVNEY.
POWER TRANSMITTING AND BRAKING DEVICE.
(Application filed Mar. 13, 1901.)
(No Model.) 3 Sheets—Sheet 1.
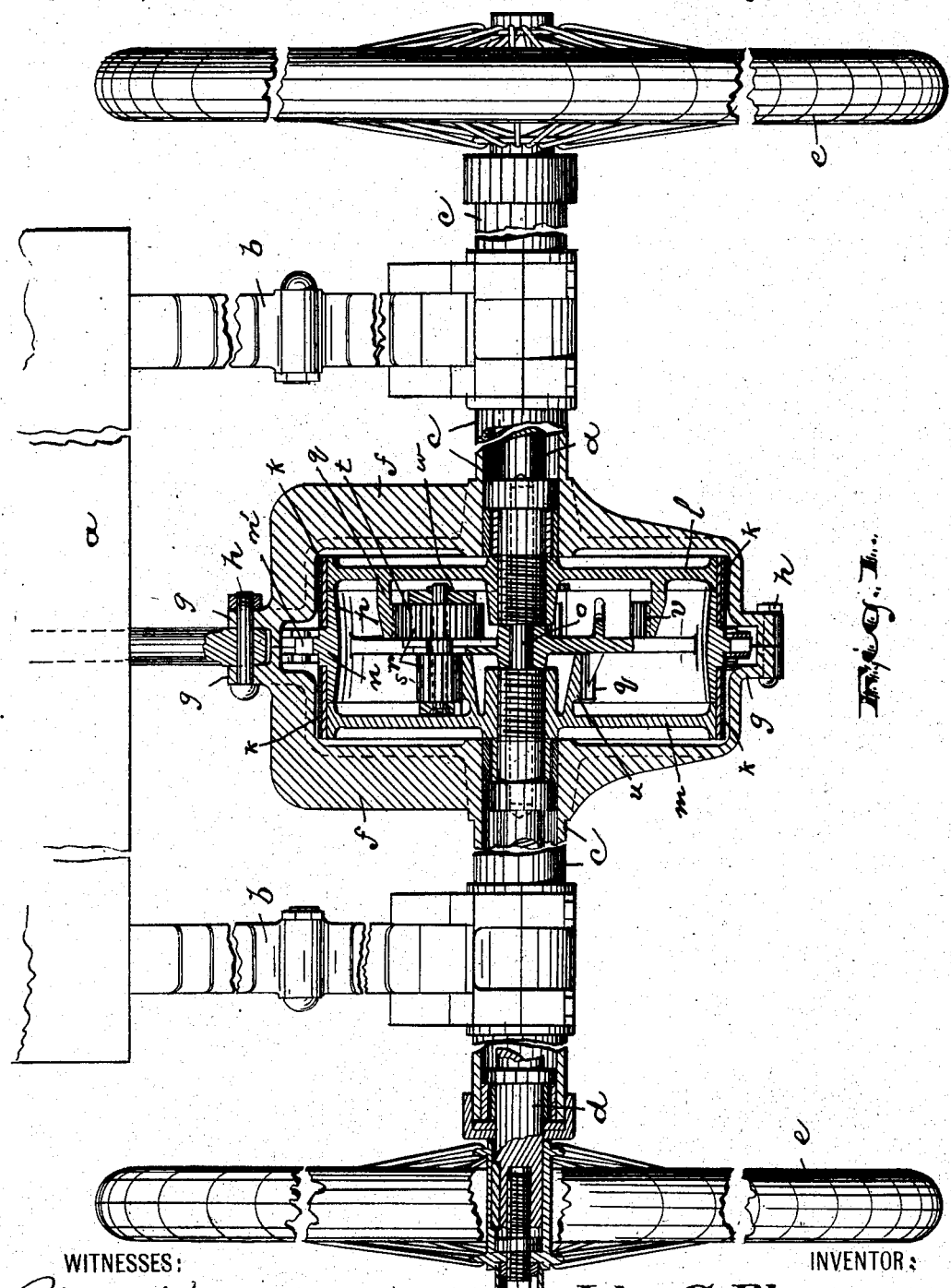
WITNESSES: INVENTOR:
John C. Blevney,
BY
ATTORNEYS.

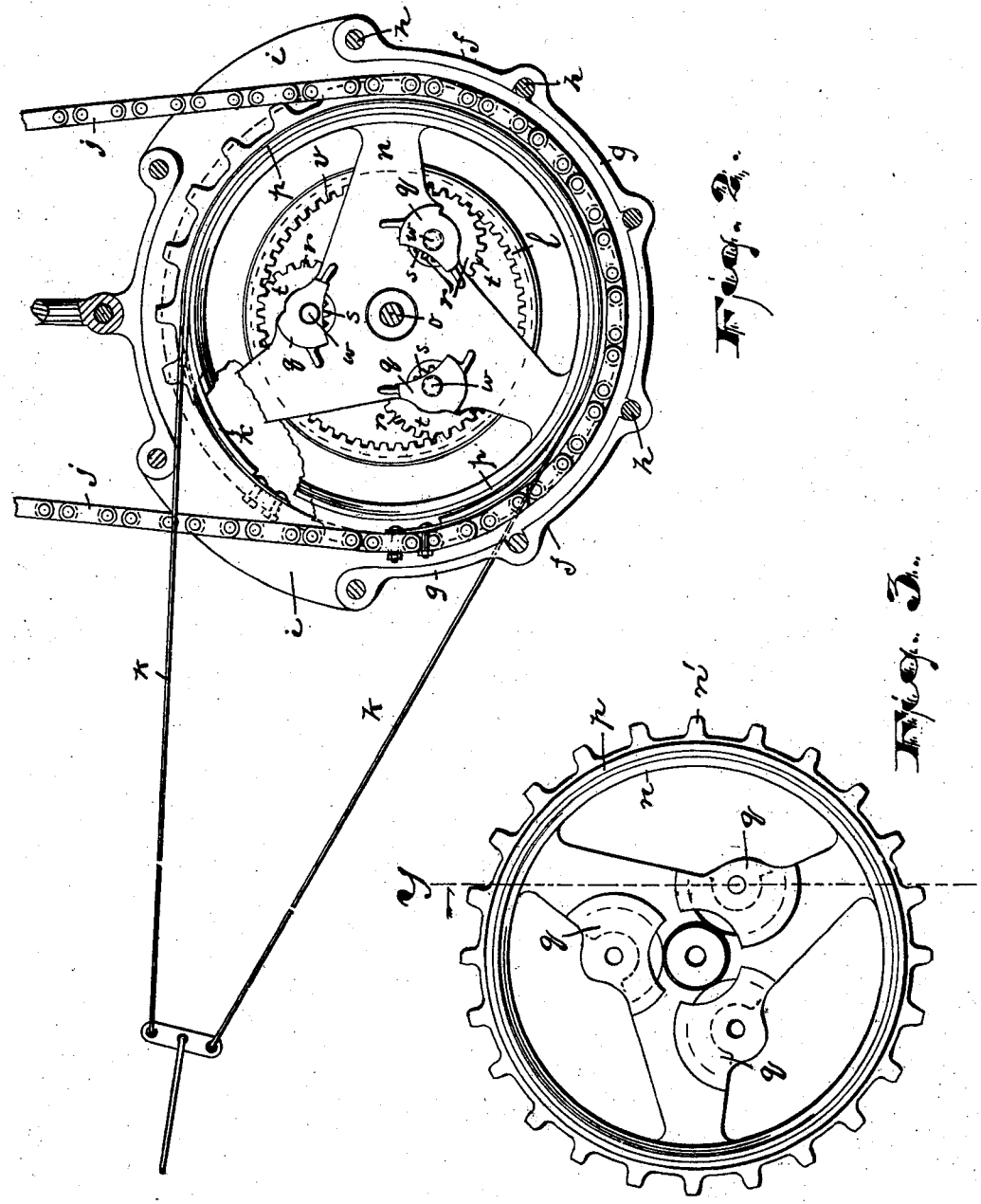

No. 693,365. Patented Feb. 18, 1902.
J. C. BLEVNEY.
POWER TRANSMITTING AND BRAKING DEVICE.
(Application filed Mar. 13, 1901.)

(No Model.) 3 Sheets—Sheet 3.

WITNESSES:
Henry King
Russell M. Everett

INVENTOR:
John C. Blevney,
BY
Drake & Co.
ATTORNEYS.

UNITED STATES PATENT OFFICE.

JOHN C. BLEVNEY, OF NEWARK, NEW JERSEY.

POWER-TRANSMITTING AND BRAKING DEVICE.

SPECIFICATION forming part of Letters Patent No. 693,365, dated February 18, 1902.

Application filed March 13, 1901. Serial No. 50,970. (No model.)

*To all whom it may concern:*

Be it known that I, JOHN C. BLEVNEY, a citizen of the United States, residing at Newark, in the county of Essex and State of New Jersey, have invented certain new and useful Improvements in Power-Transmitting and Braking Devices; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to provide a braking and power-transmitting device, more particularly for horseless carriages, which will be more compact in arrangement and more effective and certain in its operation and one which will be more perfectly free from exposure to dust and dirt; to provide braking means which will be less liable to become inoperative because of breakage; to provide a differential movement by more simple and compact means, and thereby to reduce the cost of construction and to render the outward appearance of the vehicle less cumbersome and complicated, and to secure other advantages and results, some of which may be referred to hereinafter in connection with the description of the working parts.

The invention consists in the improved power-transmitting and braking device and in the arrangements and combinations of parts of the same, all substantially as will be hereinafter set forth and finally embraced in the clauses of the claim.

Figure 4:
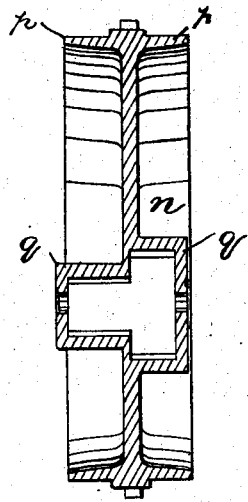
Figures 5, 6:
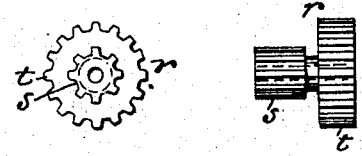
Figure 7:
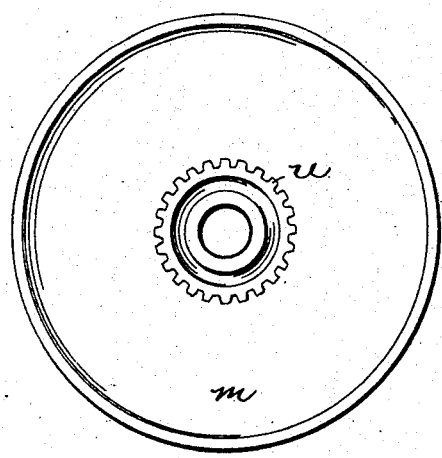
Figure 8:
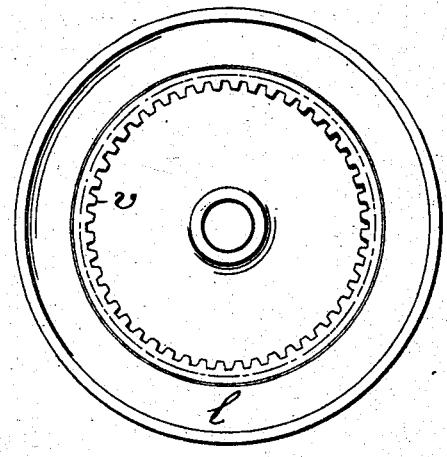

Referring to the accompanying drawings, in which like letters of reference indicate corresponding parts in each of the several views, Figure 1 is a rear elevation of a portion of a vehicle to which my improved device has been applied, parts being broken away in vertical section to show the construction and arrangement thereof more clearly. Fig. 2 is a side view of the power-transmitting devices, one of the sections of an inclosing case being removed. Fig. 3 is a detail elevation of a certain sprocket and brake wheel. Fig. 4 is a section of the same, taken at line *y* of Fig. 3. Figs. 5 and 6 are respectively face and side views of a compound pinion having bearings in or on said brake-wheel; and Figs. 7 and 8 are face views of two driving-wheels adapted to be fastened rigidly upon the axles of the vehicle to rotate therewith, said wheels being provided with spurs to engage the compound pinion above referred to and with braking-surfaces, as will be hereinafter described.

In said drawings, $a$ indicates the body of a vehicle, preferably a vehicle driven by steam or other power from motors carried thereby. $b\ b$ are the springs upon which said body is supported, said springs being in turn supported by axle-casings $c$, through which casings the axles $d$ extend to the wheels $e\ e$.

Upon the inner ends of the axle-casings $c$ are cast or otherwise rigidly fastened casing-sections $f f$, which are at their peripheral parts properly flanged, as at $g$, and perforated to receive bolts $h$, by means of which the said sections $f f$ are held together and serve to inclose and protect the braking and differential power-transmitting means, hereinafter specified. The box or casing formed by said sections is open, as at $i\ i$, to permit the out-passage of the power-transmitting chain $j$ and the brake strap or connections $k$ in any suitable manner.

Within the casings $c$ the shouldered axles $d$ are provided with screw-threads at their inner extremities, upon which are rigidly fixed correspondingly-threaded wheels $l\ m$. (Shown in section in Fig. 1 and in detail in Figs. 7 and 8.) Said wheels $l\ m$ are each provided with spurs or cogs $u\ v$ in annular series, one of the wheels being interiorly spurred, as at $v$, and the other exteriorly spurred, as at $u$, the exterior spurs being in a smaller series than the interior series of spurs. At the peripheries of said wheels $l\ m$ the same are flanged or broadened to provide a large or sufficiently large peripheral braking-surface to engage brake straps or shoes $k$, fastened upon the casing and adapted to press or be pressed upon said surfaces to secure a frictional resistance. Between the said wheels $l\ m$ and arranged upon a supplemental shaft $o$, arranged in borings within the ends of the axles $d$, is a sprocket-wheel $n$, having at its opposite sides flanges p, which coincide with the periphery of the wheels l m, the peripheral surfaces of said wheels lying flush at the same radial distance from the axes of said wheels. The brake-straps k may thus lie in braking or frictional relation with both of said flanges p and wheels l m, the said straps overlapping the parts and braking the joints, as shown in Fig. 1. The sprockets n', formed on said wheel n, are between the flanges p p and lie between the said straps and are adapted to engage with the power-transmitting chain j, so that power is transmitted from the motor to the wheel n to rotate the same upon or with its supplemental shaft o. Between the axial bearings of the driving-wheel n and the said sprockets n' and flanges p p at the periphery of said wheels the said wheel n is provided, preferably, with a series of boxes or cages q, Figs. 3 and 4, in which may be dropped and pinned one or a series of compound pinions r. (Shown in detail in Figs. 5 and 6.) One of the members s of the said compound pinions is the smaller one, having a few teeth in the series, and the other, t, is a large member with a larger number of teeth in the series. The member t engages the interior spurs v of the wheel l, and the small member s engages the exterior spurs u of the wheel m. As the wheel n rotates under the power imparted to it by the chain J and the vehicle-motor the compound pinions r revolve therewith about the axial shaft o and would rotate on their own axes if free to do so; but the relation of the smaller members of the compound pinions to the outside spurs u is such as to tend to cause said compound pinions to rotate in one direction, while the tendency of the larger members t, in connection with the inside spurs v, is to effect reverse movements of said compound pinions. The said pinions are thus locked under normal conditions with the wheels m l, and the latter are clutched and effect a rotation of the axles d d and wheels e e in one and the same direction; but should the resistance on one of the wheels e, due to the turning of a curve or otherwise, exceed that of the other wheel then will the wheel having such resistance stop entirely and the other will rotate at an increased speed until the normal is once more established. There will thus be no sliding of the wheels on the ground and a consequent wear upon the tire.

The construction of the compound pinions r, each having the large and small pinion members s t on one axle and adapted to be dropped into a box or cage q of the brake-wheels and pinned therein by the pins w, is of simple construction, permitting of quick assembling and avoiding the use of screws, which are apt to jar loose in operation, and the construction described is thus conducive to durability and ease of repair.

I am aware that various modifications and changes may be made in the construction and arrangements of the various parts without departing from the spirit and scope of the invention, and I therefore do not wish to be understood as limiting myself by the specific terms above positively employed, excepting as the prior state of the art may require.

Having thus described the invention, what I claim as new is—

1. In a power-transmitting device, the combination with the wheels and axles, of brake-wheels fixed to the adjacent inner ends of said axles, said brake-wheels having spurs formed thereon, one wheel having an interior series and the other an exterior series of spurs, and an intermediate driving-wheel with brake-flanges and compound pinions engaging the spurs, a brake-strap adapted to engage said brake-wheels and driving-wheel and means for transmitting power to said driving-wheel, substantially as set forth.

2. In a power-transmitting device, the combination with the vehicle-wheels and their axles, of brake-wheels fixed to the inner ends of said axles, said brake-wheels having spurs formed thereon in annular series, the series of one wheel being at a greater distance from the axis of rotation than the series of the other wheel, an intermediate driving-wheel having surfaces to be engaged by a brake-strap and having bearings for compound pinions, said compound pinions having each a large and a small member, one to engage one of said series of spurs and the other, the other series of spurs, and brake-straps adapted to engage both the brake-wheels and driving-wheel, substantially as set forth.

3. In a power-transmitting device, the combination with the wheels and axles, of a power-transmitting wheel independent of the said axles and adapted to be clutched thereto whereby power may be transferred from said transmitting-wheel to said axles, of a brake-wheel having its peripheral braking-surface corresponding or coinciding with a peripheral surface of said power-transmitting wheel, and a brake-strap overlapping and adapted to engage both said transmitting-wheel and brake-wheel, substantially as set forth.

4. In a power-transmitting device, the combination with the wheels and axles and a power-transmitting wheel adapted to receive power from a motor, of a brake-wheel attached to one of said axles and a brake-strap adapted to enter into braking engagement with both said power-transmitting wheel and brake-wheel at one and the same time, substantially as set forth.

5. In a power-transmitting device, the combination with the axles, of a toothed power-transmitting wheel having at opposite sides flanges, and having bearings to receive gearing by which power is transmitted from said power-transmitting wheel, of brake-wheels, at opposite sides of said power-transmitting wheel, having braking-surfaces and coöperating gearing-teeth, and intermediate gearing engaging the teeth of the power-transmitting wheel and the teeth of the brake-wheels, and brake-straps engaging both the power-transmitting wheel and the brake-wheel to stop rotation, substantially as set forth.

I testimony that I claim the foregoing I have hereunto set my hand this 11th day of March, 1901.

JOHN C. BLEVNEY.

Witnesses;
CHARLES H. PELL,
C. B. PITNEY.